US012789633B2

(12) United States Patent
Lee

(10) Patent No.: US 12,789,633 B2
(45) Date of Patent: Nov. 10, 2026

(54) CURRENT COLLECTOR FOR ELECTRIC RAILCAR, RAIL DEVICE FOR POWER TRANSMISSION, POWER LINE DEVICE AND PANTOGRAPH

(71) Applicant: Cafe24 Corp., Seoul (KR)

(72) Inventor: Jae Suk Lee, Seoul (KR)

(73) Assignee: Cafe24 Corp., Seoul (KR)

( * ) Notice: Subject to any disclaimer, the term of this patent is extended or adjusted under 35 U.S.C. 154(b) by 421 days.

(21) Appl. No.: 18/560,107

(22) PCT Filed: May 9, 2022

(86) PCT No.: PCT/KR2022/006582

§ 371 (c)(1),
(2) Date: Nov. 10, 2023

(87) PCT Pub. No.: WO2022/240103

PCT Pub. Date: Nov. 17, 2022

(65) Prior Publication Data

US 2024/0227570 A1 Jul. 11, 2024

(30) Foreign Application Priority Data

May 10, 2021 (KR) ........................ 10-2021-0059992

(51) Int. Cl.

| | |
|---|---|
| ***B60L 5/06*** | (2006.01) |
| ***B60L 5/24*** | (2006.01) |
| ***B60L 5/28*** | (2006.01) |
| ***B60L 5/38*** | (2006.01) |
| ***B60M 1/30*** | (2006.01) |

(52) U.S. Cl.
CPC .................................... *B60L 5/06* (2013.01); *B60L 5/24* (2013.01); *B60L 5/28* (2013.01); *B60L 5/38* (2013.01); *B60M 1/30* (2013.01); *B60L 2200/26* (2013.01)

(58) Field of Classification Search
CPC ...... B60L 5/06; B60L 5/24; B60L 5/28; B60L 5/38; B60L 2200/26; B60M 1/30
See application file for complete search history.

(56) References Cited

FOREIGN PATENT DOCUMENTS

| | | | | | |
|---|---|---|---|---|---|
| JP | 2000-058219 | A | | 2/2000 | |
| JP | 2003116202 | A | * | 4/2003 | |
| KR | 10-2000-0015499 | A | | 3/2000 | |
| KR | 10-2005-0080017 | A | | 8/2005 | |
| KR | 10-2006-0129181 | A | | 12/2006 | |
| KR | 10-2013-0039001 | A | | 4/2013 | |
| KR | 101559806 | B1 | * | 10/2015 | ................ B60L 5/39 |

* cited by examiner

*Primary Examiner* — Robert J McCarry, Jr.
(74) *Attorney, Agent, or Firm* — INVENSTONE PATENT, LLC

(57) ABSTRACT

One aspect of the present disclosure provides a current collector for an electric railcar. The device comprises: a current-collecting member, which is arranged on the circumference of a wheel for an electric railcar so as to collect current from an electric railcar rail; a base member coupled to the electric railcar; and a transfer member that transferring power collected by the current-collecting member to the base member, wherein the current-collecting member comes into rolling contact with the electric railcar rail by means of rolling of the wheel so as to minimize friction.

11 Claims, 8 Drawing Sheets

CURRENT COLLECTOR FOR ELECTRIC RAILCAR, RAIL DEVICE FOR POWER TRANSMISSION, POWER LINE DEVICE AND PANTOGRAPH

CROSS-REFERENCE TO RELATED APPLICATIONS

This application is a National Stage filing under 35 U.S.C. 371 of International Application No. PCT/KR2022/006582, filed on May 9, 2022, which claims the benefit of earlier filing date and right of priority to Korean Application No. 10-2021-0059992 filed on May 10, 2021 in the Korean Intellectual Property Office, the contents of which are all hereby incorporated by reference herein in their entirety.

BACKGROUND

Technical Field

The present disclosure relates to a current collector for an electric railcar, and more specifically, to a current collector for an electric railcar for collecting power to a train and a power transmission device for transmitting power thereto.

Background Art

The city transportation system is built on electric trains, subways, and monorail systems. The Trains, subways, and monorail systems are preferred public transportation means to solve urban traffic congestion and environmental problems. A current collector (power collector) is installed on the roof of an electric railcar such as an electric train, a subway train, or the like to collect power from a contact wire or trolley wire installed in the air. The current collector has been developed in various ways and structures, and pantographs are commonly used.

Korean Patent No. 10-0694309 entitled "Pantograph inspection device and method" and Korean Patent No. 10-0995910 entitled "Pantograph lifting control device" disclose the configuration of a pantograph for an electric railcar. The pantograph for electric railcars in these patent documents includes a lower frame, an upper frame as a movable mechanism, a collector shoe, an operating cylinder, and a spring. The collector shoe that directly contact the contact wire includes a main collector shoe, an auxiliary collector shoe, solid lubricant, a guide horn, etc. The main collector shoe is also called a sliding plate, a pantograph friction plate, and the like. The main collector shoe is made of copper and carbon, an iron-based sintered alloy, or an aluminum alloy.

Such a pantograph for electric railcars can collect power stably only when the collector shoe remains in constant contact with the contact wire even if the height of the contact wire changes depending on the structure of the line. In addition, it is very important to design and manufacture the pantograph so that the main collector shoe does not fall apart from the contact wire even when the electric railcar is running at high speed.

In the pantograph for electric railcars, the main collector shoe inevitably wears out due to constant friction with the contact wire, so it need to be inspected periodically and replaced with a new one. Since the main collector shoe is fixed to the upper frame by bolting, there is a disadvantage in that replacing the main collector shoe is cumbersome and time-consuming. In particular, the main collector shoe of the fixed type has a problem in that the lifespan is very short because the wear of the main collector shoe and the auxiliary collector shoe due to friction with the contact wire is large. In addition, there is a problem in that the wear prevention effect of the main collector shoe and the auxiliary collector shoe by the solid lubricant is insufficient. Moreover, the friction with the contact wire as described above has the problem of greatly reducing the efficiency of power transmission from the contact wire to the pantograph.

Accordingly, there is a need for a power collection structure for electric railcars that can prevent wear and improve power transmission efficiency.

SUMMARY

The objective of one aspect of the present disclosure to solve the above-described problem is to provide a current collector for an electric railcar that introduces a roller structure to improve power transmission efficiency, a pantograph, and a rail structure and a power line structure for transmitting power to the devices.

A current collector for an electric railcar, in accordance with one aspect of the present disclosure, comprises: a current collecting member arranged on a circumference of a wheel for an electric railcar to collect power from a rail for the electric railcar; a base member coupled to the electric railcar; and a transmission member that transmits the power collected from the current collecting member to the base member, wherein the current collecting member makes rolling contact with the rail for the electric railcar by rolling of the wheel to minimize friction.

The current collecting member may be arranged entirely or partially in a width direction of the wheel for the electric railcar.

The current collecting member may have a width corresponding to the power transmission member on the rail for the electric railcar.

The current collecting member may include a convex protrusion or a concave depression in a portion corresponding to the corresponding width.

The transmission member may include: a rotation shaft of the wheel for the electric railcar (the rotation shaft being made of a conductive conductor); and an output line for receiving power from the rotation shaft and transmitting the received power to the base member.

The current collector may further comprise: a pair of brushes mounted on both sides in a width direction of the rotation shaft to conduct electricity from the current collecting member by contacting the current collecting member and the rotation shaft.

A rail device for transmitting power to an electric railcar, in accordance with another aspect of the present disclosure, comprises: a power transmission member for transmitting power to a current collecting member arranged on a wheel for the electric railcar, wherein the rail device is arranged on a rail for the electric railcar and makes rolling contact with the current collecting member to minimize friction.

The power transmission member may be arranged on a first rail for the electric railcar on which the electric railcar runs, or a second rail for the electric railcar disposed independently of the first rail.

The power transmission member may have a width corresponding to the current collecting member of the electric railcar.

The power transmission member may include a convex protrusion or a concave depression in a portion corresponding to the corresponding width.

A power line device for transmitting power to an electric railcar, in accordance with still another aspect of the present disclosure, comprises: a power transmission member for transmitting power to a pantograph provided with a movable mechanism mounted on a roof of the electric railcar, wherein the power transmission member receives power from a power line and transmits the received power to the pantograph, and the power transmission member is configured in a roller shape and makes rolling contact with the pantograph to minimize friction.

A power line device for transmitting power to an electric railcar, in accordance with another aspect of the present disclosure, comprises: a power line for transmitting power to a pantograph provided with a movable mechanism mounted on a roof of the electric railcar; and a power transmission support member disposed around the power line to support power transmission from the power line to the pantograph, wherein the power transmission support member is configured in a roller shape and makes rolling contact with the pantograph to minimize friction.

A pantograph provided with a movable mechanism mounted on a roof of an electric railcar, in accordance with still another aspect of the present disclosure, comprises: the movable mechanism; and a current collecting member, provided at an upper end of the movable mechanism, for collecting current in conjunction with a power transmission member for transmitting power from a power line to the pantograph, wherein the current collecting member has a roller shape corresponding to the power transmission member having a roller shape.

In the current collector for the electric railcar, the pantograph, and the rail structure and the power line structure for transmitting power to the devices according to the present disclosure, it is possible to prevent wear and tear, thereby improving reliability and minimizing power loss.

DESCRIPTION OF EXEMPLARY EMBODIMENTS

Figure 1:
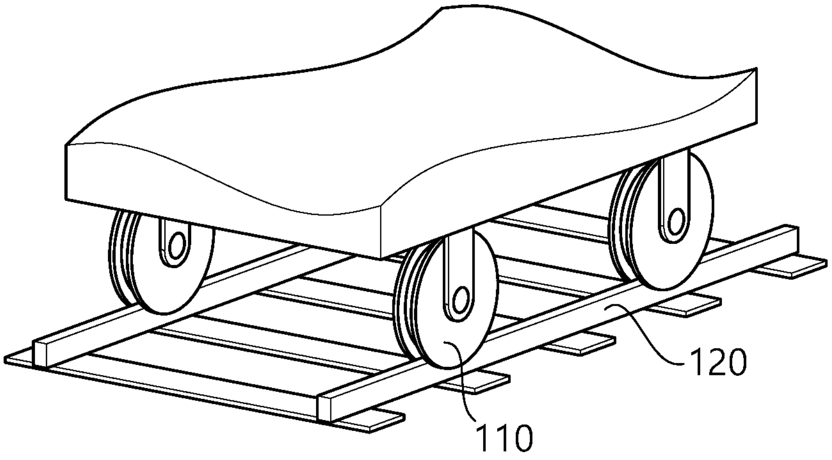
FIG. 1 is a conceptual diagram illustrating the interoperation of a current collector for an electric railcar and a rail device, according to one embodiment of the present disclosure.
Figure 2:
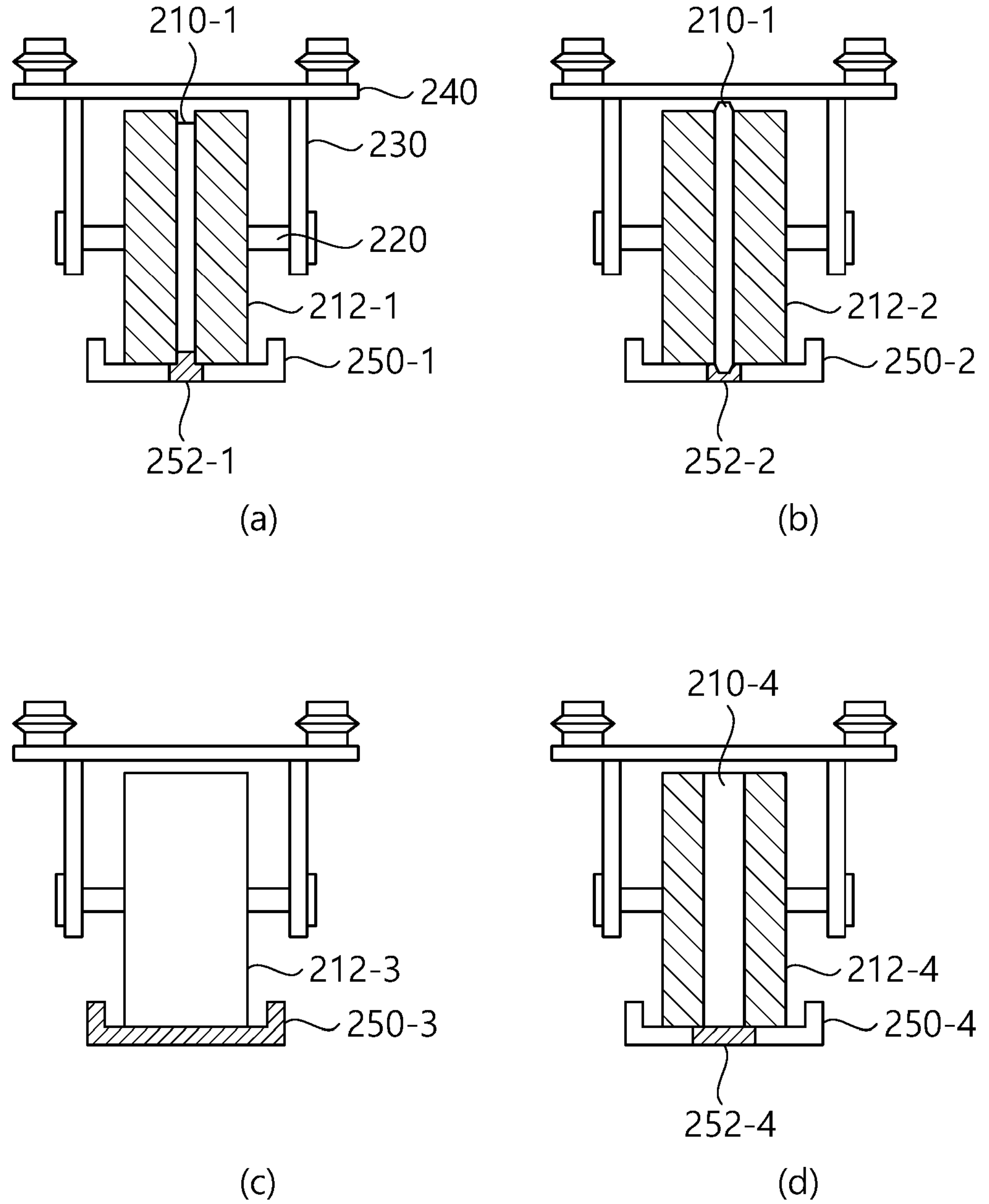
FIGS. 2A to 2D show cross-sectional diagrams of various embodiments of a current collector for an electric railcar and a rail device of the present disclosure.

The present disclosure is subject to various modifications and may have many different embodiments, and specific embodiments are illustrated in the drawings and described in detail.

However, this is not intended to limit the present disclosure to the specific embodiments and is to be understood to include all modifications, equivalents or substitutions that are within the scope of the idea and technology of the present disclosure.

The terms such as first, second, etc. may be used to describe various components, but the components should not be limited by such terms. The terms are used only to distinguish one component from another. For example, without departing from the scope of the present disclosure, a first component may be named a second component, and similarly, the second component may be named the first component. The term "and/or" includes a combination of a plurality of related items or any of the plurality of related items.

When a component is said to be "coupled" or "connected" to another component, it should be understood that it may be directly coupled or connected to another component, but there may be other components between them. On the other hand, when a component is said to be "directly coupled" or "directly connected" to another component, it should be understood that there is no other component between them.

The terms used in the present specification are used to describe specific embodiments only and are not intended to limit the disclosure. The singular expression includes the plural unless the context clearly indicates otherwise. In the present specification, the terms "include" or "have" and the like are intended to designate the presence of the features, numbers, steps, actions, components, parts, or combinations thereof recited in the specification, and not to exclude the possibility of the presence or addition of one or more other features, numbers, steps, actions, components, parts, or combinations thereof.

Unless otherwise defined, all terms used herein, including technical or scientific terms, have the same meaning as commonly understood by those skilled in the art to which the present disclosure pertains. The terms, as defined in commonly used dictionaries, should be construed to have a meaning consistent with their contextual meaning in the relevant art and should not be construed to have an idealized or unduly formal meaning unless expressly defined in the present specification.

Hereinafter, preferred embodiments of the present disclosure will be described in more detail with reference to the accompanying drawings. In describing the present disclosure, identical components in the drawings will be designated by the same reference numerals for ease of overall understanding and redundant descriptions of the same components will be omitted.

FIG. 1 is a conceptual diagram illustrating the interoperation of a current collector for an electric railcar and a rail device, according to one embodiment of the present disclosure.

Referring to FIG. 1, a current collector for an electric railcar is typically mounted on the roof of the electric railcar to be formed to contact a contact wire suspended in the air above the electric railcar, but in accordance with one embodiment of the present disclosure, the current collector for an electric railcar is formed on a wheel 110 and configured to collect power from a power transmission device arranged on a rail 120, with the collection device. In this case, the current collector may be referred to as a current collecting means or a current collecting member, and the power transmission device includes a means or structure for transmitting power to the electric railcar, such as a power line, which may be referred to as a power transmission means, structure, or member. The presence of the current collector arranged on the wheel 110 eliminates the need for separate structures for contacting a contact wire in the air (e.g., a link mechanism that is provided on the roof of the electric railcar and is moved up/down or extended/contracted utilizing air pressure and elastic forces). In addition, the current collector rotates along with the rotation of the wheel 110 to be in rolling contact with the power transmission device on the rail 120 due to the rotation, which prevents wear, prevents the generation of noise and vibration, resulting in improved reliability of the current collector. Further, losses due to friction during power transmission can be minimized, which improves durability and power transmission efficiency. The power transmitted from the power transmission device on the rail 120 to the current collector on the electric railcar wheel 110 formed as described above is transmitted to a base member coupled to the electric railcar by a power transmission member (including a power line described later in an embodiment of FIG. 4), and the base member uses the power transmitted to operate the electric railcar.

FIGS. 2A to 2D show cross-sectional diagrams of various embodiments of the current collector for an electric railcar and a rail device of the present disclosure.

Referring to FIG. 2A, a current collecting member 210-1 may be arranged in a central portion in a width direction of an electric railcar wheel 212-1. The current collecting member 210-1 is preferably arranged along a circumferential direction of the wheel 212-1. However, the current collecting member 210-1 may also be arranged partially along the circumferential direction. The current collecting member 210-1 may be configured to form a slightly concave portion in the central portion of the electric vehicle wheel 212-1. The current collecting member 210-1 may have a shape corresponding to a power transmission member 252-1 of a rail 250-1. That is, it may have a width and a shape corresponding to those of the power transmission member 252-1. The power transmission member 252-1 may be formed to protrude as much as the current collecting member 210-1 is recessed. Meanwhile, the power transmission member 252-1 may be formed entirely throughout the rail 250-1. However, in such a case, a high-voltage current flows throughout the rail 250-1, increasing the risk, so the power transmission member 252-1 may be formed only in a portion of the central portion in the width direction of the rail 250-1. That is, the power transmission member 252-1 may be formed as a conductor, and the portion of the rail 250-1 except for the power transmission member 252-1 may be formed as a conductor, so that no current flows except for the power transmission member 252-1. In this case, the width of the power transmission member 252-1 may be the same as the width of the current collecting member 210-1, or the former may be wider than the latter. In some cases, the former may be narrower than the latter. This may be referred to as a corresponding width. The power transmitted from the power transmission member 252-1 to the current collecting member 210-1 is transmitted to a rotation shaft 220 of the wheel 212-1. For this purpose, the rotation shaft 220 is made of a conductive conductor. The rotation shaft 220 is configured as a fixed shaft that is fixed at both ends to brackets 230 of a base member 240. With the above structure, the wheel 212-1 is provided to rotate about the rotation shaft 220, and the current collecting member 210-1 located at its center also rotates.

Referring to FIG. 2B, a current collecting member 210-2 may be arranged along a circumferential direction of an electric railcar wheel 212-2 and may be partially arranged in a central portion in a width direction thereof. The current collecting member 210-2 may be configured to form a slightly convex portion in the central portion of the electric railcar wheel 212-2. The current collecting member 210-2 may have a shape corresponding to a power transmission member 252-2 of a rail 250-2. That is, it may have a width and a shape corresponding to those of the power transmission member 252-2. The power transmission member 252-2 may be formed to be recessed as much as the current collecting member 210-2 protrudes convexly.

Referring to FIG. 2C, a current collecting member 210-3 may be arranged along a circumferential direction of an electric railcar wheel 212-3 and may be entirely arranged in a central portion in a width direction thereof. Further, to correspond to the overall configuration of the current collecting member 210-3, a power transmission member may also be formed entirely as a rail 250-3.

Referring to FIG. 2D, a current collecting member 210-4 may be arranged along a circumferential direction of an electric car wheel, and may be partially arranged in a central portion in a width direction thereof while having no separate concave or convex portion. Correspondingly, a power transmission member 252-4 may be partially arranged in a central portion in a width direction of a rail 250-4 and may have a width corresponding to that of the current collecting member 210-4.

Figure 3:
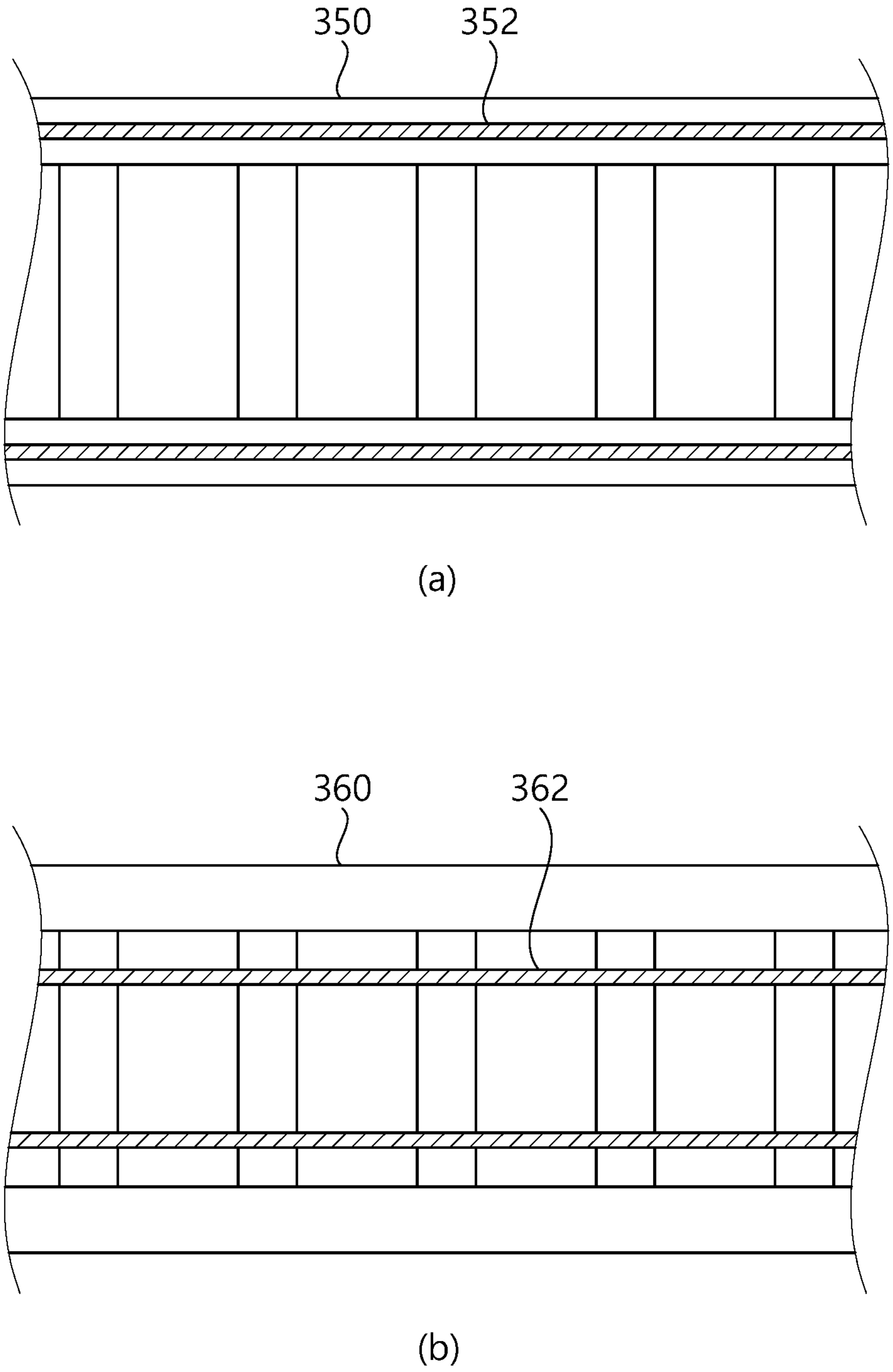
FIGS. 3A and 3B show diagrams illustrating various embodiments of a rail device interoperating with the current collector for an electric railcar of the present disclosure.

FIGS. 3A and 3B show diagrams illustrating various embodiments of a rail device that interoperates with the current collector for an electric railcar of the present disclosure.

Referring to FIG. 3A, a power transmission member 352 may be configured to exist in a portion of a rail 350. That is, the power transmission member 352 is arranged on the rail 350 on which the electric railcar runs.

Meanwhile, referring to FIG. 3B, a power transmission member 362 may be arranged as a separate rail from a rail 360. That is, the power transmission member 362 may be arranged independently of the rail 360 on which the electric railcar runs. Corresponding to this configuration, the current collecting member may be configured in the form of a separate wheel or other current collecting means close to the wheels for running the electric railcar.

Figure 4:
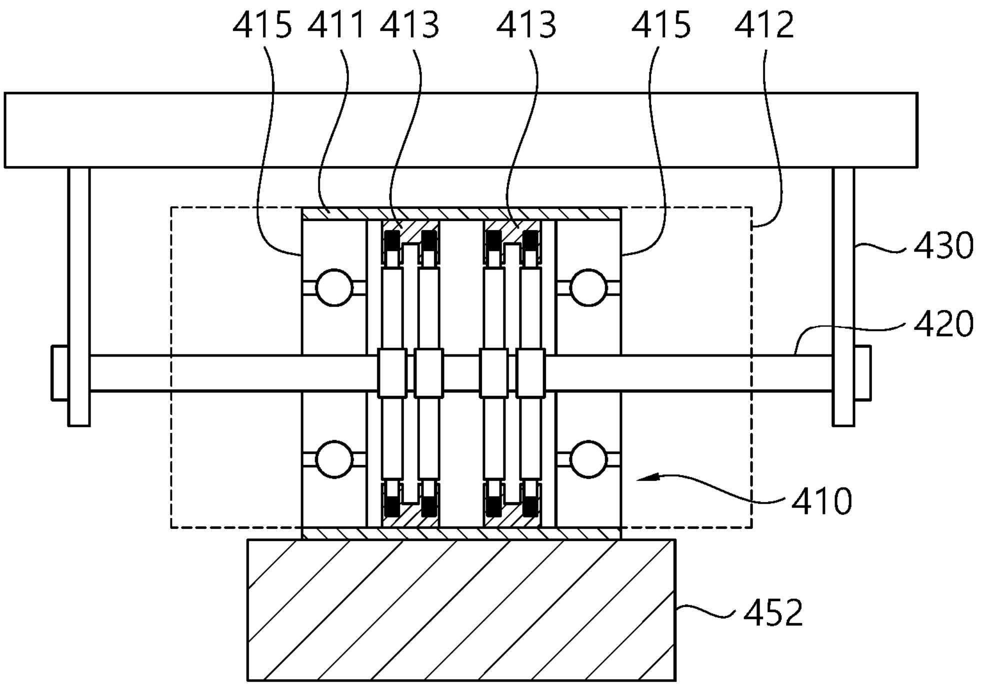
FIG. 4 is a cross-sectional diagram illustrating the configuration of a roller of the current collector for an electric railcar, according to one embodiment of the present disclosure.

FIG. 4 is a cross-sectional view showing the configuration of a roller of the current collector for an electric railcar, according to one embodiment of the present disclosure.

Referring to FIG. 4, a current collecting member 410 is rotatably mounted on a rotation shaft 420. An axis hole into which the rotation shaft 420 is inserted is formed in the center of the current collecting member 410. The current collecting member 410 has an outer peripheral surface 411 that contacts a power transmission member 452 of a rail, which is formed on an outer surface of the current collecting member 410 along a circumferential direction thereof. The current collecting member 410 may be configured as a spherical roller or a barrel roller by the outer peripheral surface 411 formed in the center of the outer surface. That is, the current collecting member 410 may be configured as rollers of different shapes depending on whether the shape of the outer peripheral surface 411 is concave or convex. The outer peripheral surface 411 is made of a highly conductive material and collects power from the power transmission member 452. For example, it may be made of a material similar to a main collector shoe, such as copper and carbon, an iron-based sintered alloy, or an aluminum alloy.

Meanwhile, a pair of brushes 413 is mounted on both sides of the rotation shaft 420. The brushes 413 are in contact with the rotation shaft 420 and the current collecting member 410, and conduct electricity from the current collecting member 410 to the rotation shaft 420. An output line (not shown) that outputs power from the rotation shaft 420 is connected to the rotation shaft 420. A pair of bearings 415 is mounted between the rotation shaft 420 and the current collecting member 410 to support the rotation of the current collecting member 410.

The current collecting member 410 for an electric railcar having such configurations collects power from the power transmitting member 452 while making rolling-sliding contact with the power transmitting member 452 of the rail. The power flows from the power transmission member 452 through the current collecting member 410, the brushes 413, the rotation shaft 420, and the output line (not shown) and is used for the operation of the electric railcar.

Meanwhile, the frictional resistance is greatly reduced by the rolling-sliding friction between the power transmission member 452 and the current collecting member 410, which prevents wear of the current collecting member 410 and the generation of noise and vibration, thereby increasing reliability. In particular, compared to uneven wear of the collector shoe of a conventional pantograph, uneven wear of the current collecting member 410 is prevented. By minimizing wear and friction, power loss is prevented, thereby maximizing power transmission efficiency.

Figure 5:
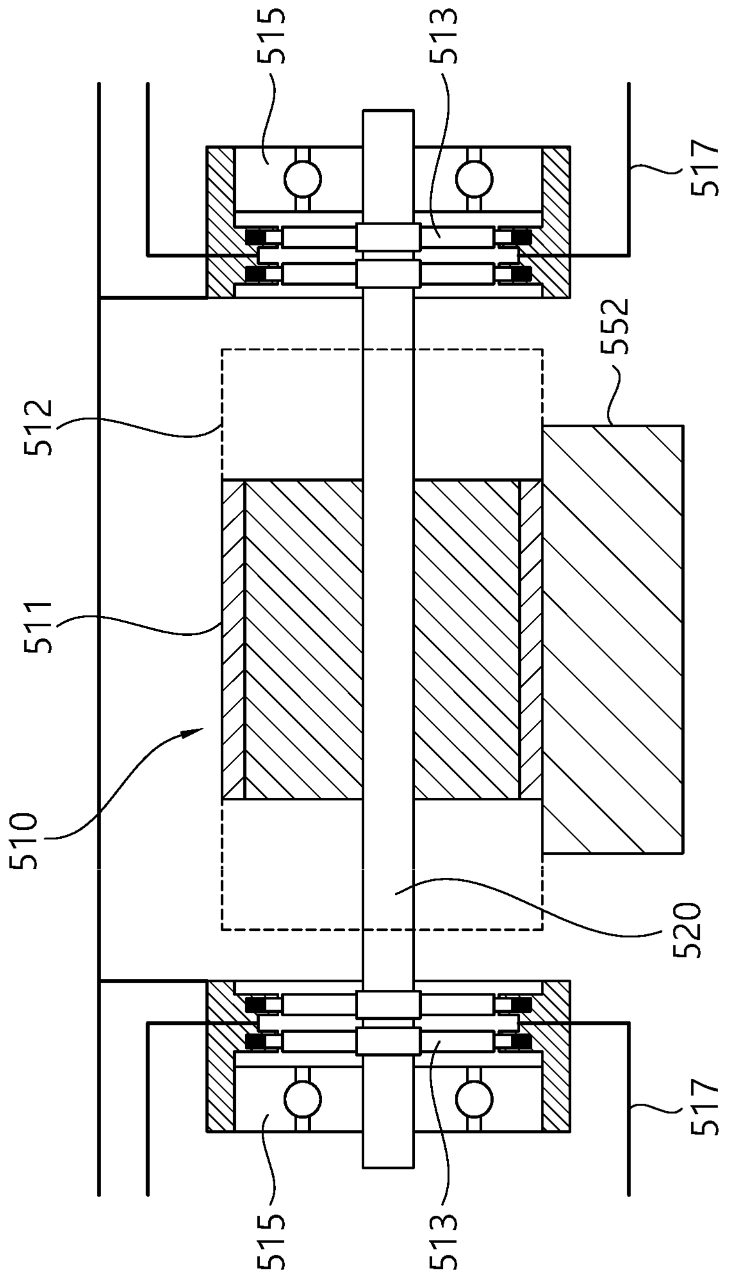
FIG. 5 is a cross-sectional diagram illustrating the configuration of a roller of the current collector for an electric railcar, according to another embodiment of the present disclosure.

FIG. 5 is a cross-sectional view showing the configuration of a roller of the current collector for an electric railcar according to another embodiment of the present disclosure.

Referring to FIG. 5, a current collecting member 510 according to another embodiment of the present disclosure includes a base member, a rotation shaft 520, a pair of brushes 513, and a pair of bearings 515, as in the embodiment of FIG. 4. Further, it may include a pair of output lines 517.

A rotation shaft 520 mounted on the base member is made of a conductive conductor. Both ends of the shaft 120 are rotatably supported on the base member by the bearings 515. The current collecting member 510 is mounted at a central portion of the rotation shaft 520 to rotate with the rotation shaft 520, and an axis hole into which the rotation shaft 520 is inserted and fixed is formed in the center of the current collecting member 510. The current collecting member 510 has an outer peripheral surface 511 that contacts a power transmission member 552 of a rail, which is formed on an outer surface thereof along its circumferential direction.

The pair of brushes 513 is mounted on both ends of the rotation shaft 520. The brushes 513 are disposed between both ends of the current collecting member 510 and the bearings 515. The brushes 513 and the bearings 515 are mounted on brackets (not shown) of the base member. The output lines 517 may be connected to the brushes 513 to output power.

In the current collecting member 510 having such configurations according to another embodiment, the outer peripheral surface 511 of the current collecting member 510 makes rolling-sliding contact with the power transmitting member 552 to collect power from the power transmitting member 552. The power flows from the power transmission member 552 through the current collecting member 510, the rotation shaft 520, the brushes 515, and the output line 517, and is used for the operation of the electric railcar.

Figure 6:
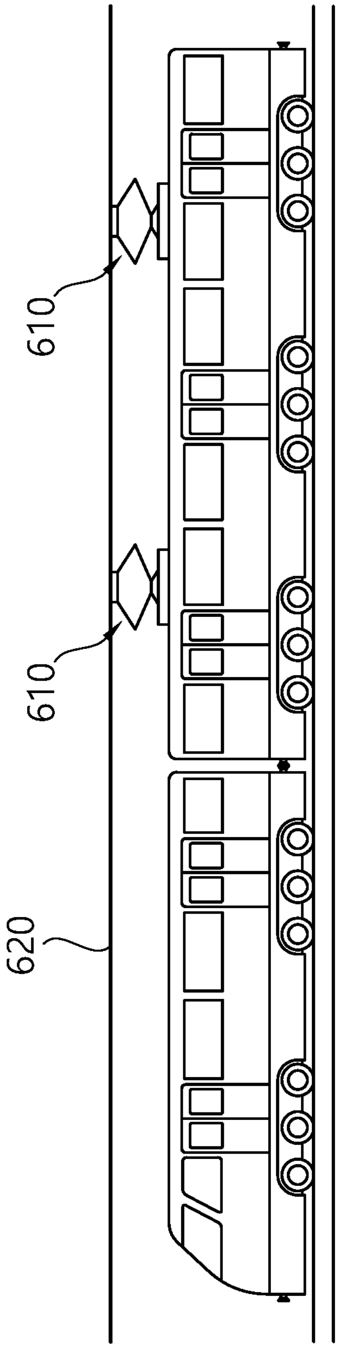
FIG. 6 is a side view showing a pantograph for an electric railcar, according to one embodiment of the present disclosure.

FIG. 6 is a side view showing a pantograph for an electric railcar according to one embodiment of the present disclosure.

Referring to FIG. 6, a pantograph 610 for an electric railcar is a device for collecting power from a power line 620, and may include a movable mechanism and a current collecting member. In particular, a lower frame and an upper frame are provided as the movable mechanism. The lower frame is fixedly mounted on the roof of the electric railcar. The upper frame is mounted on top of the lower frame.

Meanwhile, in FIG. 6, a double-arm type pantograph is shown, in which the upper frame as the movable mechanism is configured as a diamond-shaped link mechanism that is moved up/down or extended/contracted by air pressure and elastic force, etc., but this is an example. It will be obvious to those skilled in the art to which the present disclosure pertains that the pantograph 610 may be configured as a single-arm type. In addition, the link structure of the upper frame may be appropriately changed as needed.

Figure 7:
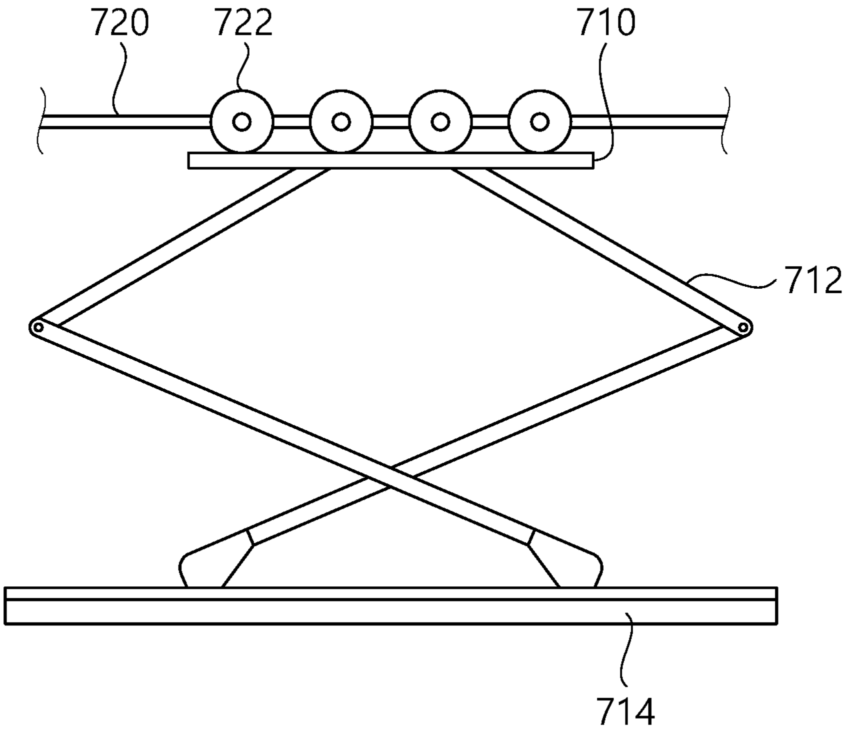
FIG. 7 is a side view showing a structure of a power line device interoperating with the pantograph for an electric railcar, according to one embodiment of the present disclosure.

FIG. 7 is a side view showing the structure of a power line device interoperating with the pantograph for an electric railcar, according to one embodiment of the present disclosure.

Referring to FIG. 7, a power transmission member 722 on a power line 720 may be implemented in the form of a roller. The roller-shaped power transmission member 722 receives power from the power line 720 and transmits the power to a current collecting member 710 of the pantograph. In this case, the power transmission member 722 has the same or similar structure as the current collecting member on the wheel for an electric railcar according to one embodiment of the present disclosure of FIGS. 1 to 5, and transmits power from the power line 720 to an outer peripheral surface of the roller-shaped power transmission member 722. That is, the components such as the brushes, the bearings, and the rotation shafts may be applied, and power is transmitted from the power line 720 through an output line inside the power transmission member 722, and power is transmitted from the output line through the brushes and the rotation shaft to the roller-shaped power transmission member 722. Further, the power transmitted to the power transmission member 722 in this way can reach the outer peripheral surface of the roller.

The power transmitted to the power transmission member 722 is supplied to the current collecting member 710 of the pantograph. The current collecting member 710 is flexibly supported by upper and lower frames 712 and transmits the power to a base member 714 to be used for the operation of the electric railcar. Meanwhile, the current collecting member 710 may be implemented in the form of a collector shoe. The collector shoe may be called a sliding plate or a pantograph friction plate, and may be made of copper and carbon, an iron-based sintered alloy, or an aluminum alloy material.

Although only the collector shoe form is shown in the embodiment of FIG. 7, it may be implemented in the form of a roller to minimize friction and wear. That is, it may be implemented in a form where two rollers are engaged. In this case, when one roller has a convex shape, the other roller has a correspondingly concave shape so that they can engage with each other.

Figure 8:
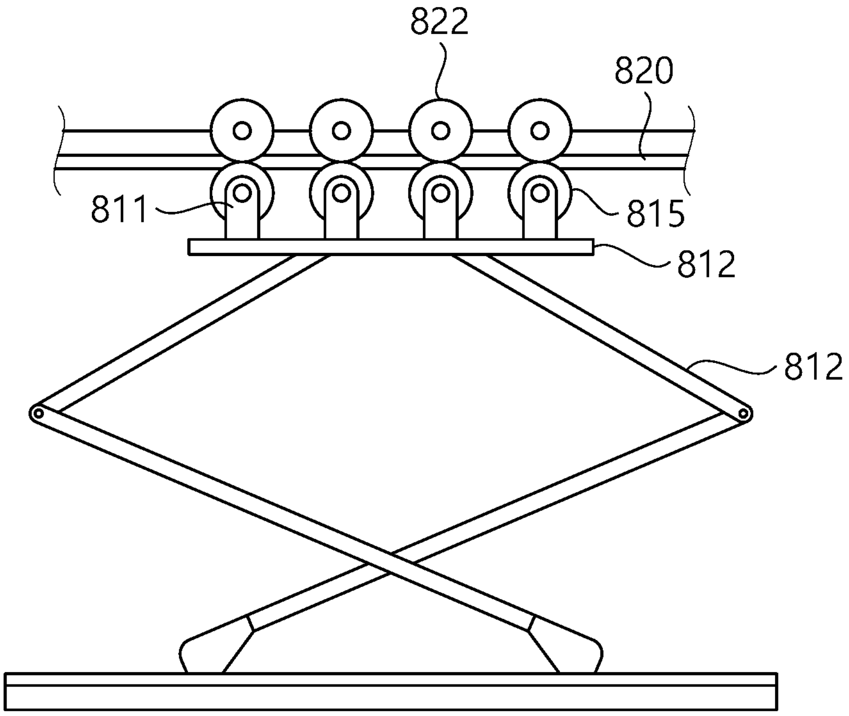
FIG. 8 is a side view showing a structure of a power line device interoperating with the pantograph for an electric railcar, according to another embodiment of the present disclosure.

FIG. 8 is a side view showing the structure of a power line device interoperating with the pantograph for an electric railcar, according to another embodiment of the present disclosure.

Referring to FIG. 8, two rollers 822 and 815 are engaged and rotate with a power line 820 therebetween. In this case, one roller 822 is a roller to support power transmission from the power line 820 (which may be called a power transmission member or power transmission support member), and the other roller 815 is a current collecting member of an electric railcar. The current collecting member 815 in the form of a roller engages with the roller 822 to prevent friction and wear. That is, the roller 822 rotates in engagement with the current collecting member 815 to reduce friction when transmitting power from the power line 820 to the current collecting member 815, thereby minimizing power loss. In another example, the two rollers 815 and 822 are implemented in the form of teeth that engage each other to minimize friction. The power transmission support member 822 and the power line 820 may be collectively referred to as a power line device.

Meanwhile, the current collecting member 815 has the same or similar structure as the current collecting member on the wheel for an electric railcar according to one embodiment of the present disclosure in FIGS. 1 to 5, and receives power from the power line 820 through the outer peripheral surface of the roller 822. Then, the current collecting member 815 transmits the power to the electric railcar through the rotation shaft and the power line. Further, in this case, the brushes may be arranged on both sides of the rotation axis. The bearings may be arranged between the rotation shaft and the roller 822. Both the brushes and the bearings may be mounted on a bracket 811 of the upper frame 810. The output line is connected to the brush for output of power. With the above configurations, the roller-shaped current collecting member 815 can receive power from the power line 820, and the power collected by the current collecting member 815 can be transmitted to the base member coupled to the electric railcar. The outer peripheral surface of the roller 815 may have a convex surface to improve contact with the power line 820. Alternatively, it may have a concave surface corresponding to the shape of the power line 820.

In another example, the shape of the current collecting member 815 may be formed to correspond to the shape of the power transmission support member 822.

Although the description has been made with reference to the drawings and the embodiments, this does not mean that the protection scope of the present disclosure is limited by the drawings or the embodiments, and it will be understood by those skilled in the art that various modifications and changes may be made to the present disclosure without departing from the idea and scope of the present disclosure as set forth in the following claims.

What is claimed is:

1. A current collector for an electric railcar, the current collector comprising:

a current collecting member arranged on a circumference of a wheel for the electric railcar to collect power from a rail for the electric railcar;

a base member coupled to the electric railcar; and a transmission member that transmits the power collected from the current collecting member to the base member, wherein the current collecting member has an outer peripheral surface that contacts the rail and collects power from the rail while the outer peripheral surface rolls along the rail by rolling of the wheel.

2. The current collector of claim 1, wherein the current collecting member is arranged entirely or partially in a width direction of the wheel for the electric railcar.

3. The current collector of claim 2, wherein the current collecting member has a width corresponding to the power transmission member on the rail for the electric railcar.

4. The current collector of claim 3, wherein the current collecting member includes a convex protrusion or a concave depression in a portion corresponding to the corresponding width.

5. The current collector of claim 1, wherein the transmission member includes:

a rotation shaft of the wheel for the electric railcar, the rotation shaft being made of a conductive conductor; and an output line for receiving power from the rotation shaft and transmitting the received power to the base member.

6. The current collector of claim 1, wherein the transmission member includes:

a rotation shaft of the wheel for the electric railcar; and a pair of brushes mounted on both sides in a width direction of the rotation shaft to conduct electricity from the current collecting member by contacting the current collecting member and the rotation shaft.

7. A rail device for transmitting power to an electric railcar, the rail device comprising:

a power transmission member for transmitting power to a current collecting member arranged on a wheel for the electric railcar, wherein the rail device is arranged on a rail for the electric railcar, and wherein the power transmission member contacts an outer peripheral surface of the current collecting member and transmits power to the current collecting member while the outer peripheral surface rolls along the rail by rolling of the wheel.

8. The rail device of claim 7, wherein the power transmission member is arranged on a first rail for the electric railcar on which the electric railcar runs, or a second rail for the electric railcar disposed independently of the first rail.

9. The rail device of claim 7, wherein the power transmission member has a width corresponding to the current collecting member of the electric railcar.

10. The rail device of claim 7, wherein the power transmission member includes a convex protrusion or a concave depression in a portion corresponding to a width of the current collecting member of the electric railcar.

11. A power line device for transmitting power to an electric railcar, the power line device comprising:

a power transmission member for transmitting power to a pantograph provided with a current collecting member and a movable mechanism mounted on a roof of the electric railcar, wherein the power transmission member receives power from a power line, and wherein the power transmission member includes at least one roller having an outer peripheral surface that contacts the current collecting member and transmits the received power to the current collecting member while the outer peripheral surface rolls along the current collecting member.

* * * * *